United States Patent [19]

Clinch

[11] Patent Number: 5,108,239
[45] Date of Patent: Apr. 28, 1992

[54] PUSH-IN FASTENER

[75] Inventor: James P. Clinch, Farmington Hills, Mich.

[73] Assignee: Eaton Corporation, Cleveland, Ohio

[21] Appl. No.: 710,889

[22] Filed: Jun. 6, 1991

[51] Int. Cl.[5] .................................... F16B 37/02
[52] U.S. Cl. .................................. 411/175; 411/437; 411/516
[58] Field of Search ............... 411/175, 173, 182, 61, 411/60, 57, 918, 516, 524, 508, 970, 437

[56] References Cited

U.S. PATENT DOCUMENTS

| | | | |
|---|---|---|---|
| 1,702,920 | 2/1929 | Tomkinson | 411/61 |
| 2,165,412 | 7/1939 | Place | 24/213 |
| 2,275,119 | 3/1942 | Wiley | 24/73 |
| 2,313,358 | 3/1942 | Periman . | |
| 2,322,656 | 6/1943 | Murphy | 24/73 |
| 2,330,770 | 9/1943 | Wiley | 24/73 |
| 2,369,962 | 2/1945 | Gisondi . | |
| 2,471,247 | 5/1949 | Stadler | 24/213 |
| 2,720,135 | 10/1955 | Gisondi | 411/61 |
| 3,207,022 | 9/1965 | Tinnerman . | |
| 3,523,299 | 8/1970 | Tinnerman . | |
| 4,595,325 | 6/1986 | Moran et al. | 411/173 |
| 4,826,375 | 5/1989 | Holton | 411/524 X |

FOREIGN PATENT DOCUMENTS

| | | | |
|---|---|---|---|
| 116844 | 9/1899 | Fed. Rep. of Germany | 411/61 |
| 1317534 | 1/1963 | France | 411/437 |
| 2303983 | 10/1976 | France | 411/508 |

*Primary Examiner*—Rodney M. Lindsey
*Attorney, Agent, or Firm*—A. E. Chrow

[57] ABSTRACT

A push-in fastener (50) is provided having a base portion (4) having a threaded aperture (11) for receiving a threaded member (8) therethrough and from which a pair of spaced-apart resilient legs (14,14') extend that are configured to contract towards each other sufficiently to be received through an opening (16) through a workpiece (12) and then expand to secure fastener (50) thereto yet have respective free-ends (18,18') that are lockingly engaged together by a tab (20) in one of legs (14,14') to prevent warpage and undesirable movement in the legs (14,14').

5 Claims, 1 Drawing Sheet

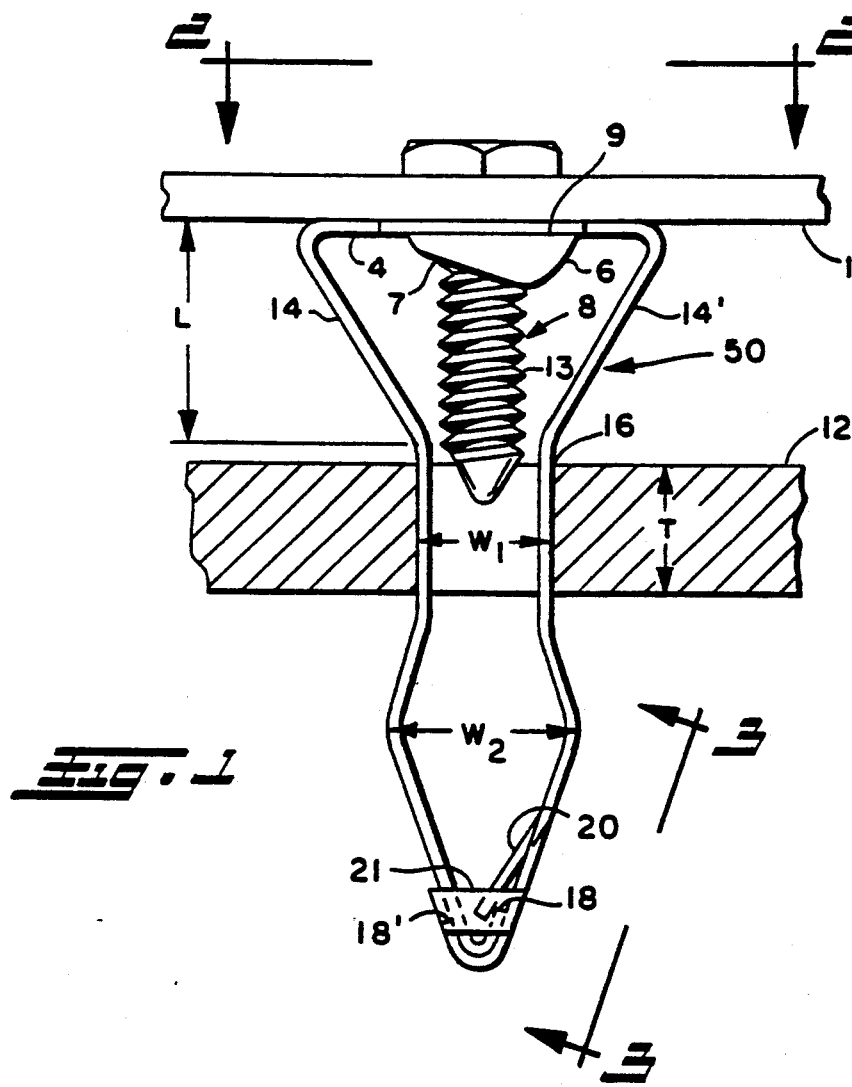
Fig. 1
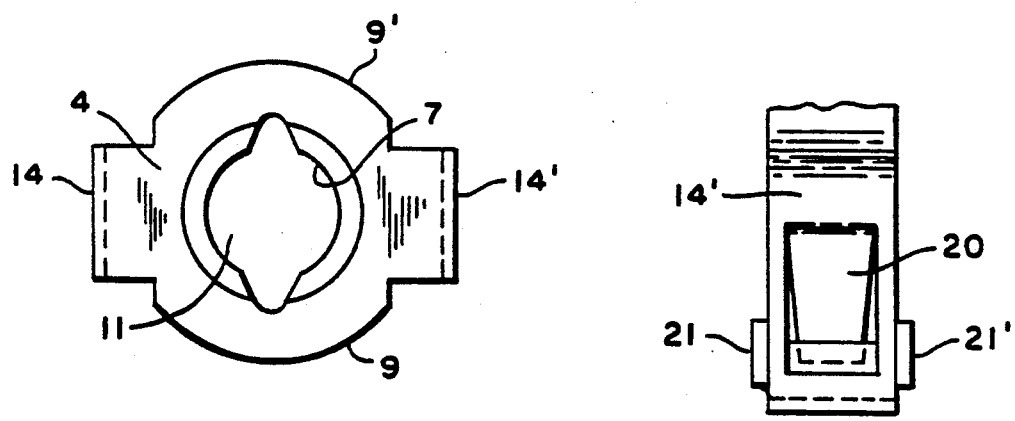
Fig. 2
Fig. 3

PUSH-IN FASTENER

INTRODUCTION

This invention relates generally to a push-in type fastener having a pair of resilient legs adapted to contract towards each other when pressed into an opening in a workpiece and then expand when through the opening to lock the fastener to the workpiece and more particularly to such fastener having a tab lock to lock the legs together in proximity to their respective free-ends as a means of maintaining contact therebetween and preventing undesirable movement relative each other.

BACKGROUND OF THE INVENTION

Push-in fasteners (sometimes called dart fasteners in the trade) have been known for many years. Examples of push-in fasteners where the legs are integral with each other can be seen in U.S. Pat. Nos. 2,369,962 and 2,471,247, the disclosures of which are incorporated herein by reference. Examples of push-in fasteners where the legs are not integral and yet engage each other adjacent their respective free-ends can be seen in U.S. Pat. Nos. 2,165,412; 2,275,119; 2,322,656; 2,330,770 and 2,369,962, the disclosures of which are incorporated herein by reference and which are of the type to which the present invention is addressed.

Generally, the free-ends of such prior art fastener legs were either folded so as to nest together or were left spaced apart from each other leaving them susceptible to movement relative to each other. The present invention improves upon such fasteners by providing a tab lock on one leg adjacent its free-end to provide a pocket into which the free-end the other leg is received to lockingly connect the two legs together to restrain against undesirable movement of one leg relative the other and maintain contacting engagement therebetween.

SUMMARY OF THE INVENTION

Accordingly, it is an object of this invention to provide a push-in fastener having a pair of resiliently compressible legs.

It is another object of this invention to provide a push-in fastener having a pair of resiliently compressible legs whose respective free-ends are lockingly engaged together.

It is still a further object of this invention to provide a push-in fastener having a pair of resiliently compressible legs whose free-ends are lockingly engaged by means of a tab lock on one of the legs in proximity to its free-end.

BRIEF DESCRIPTION OF THE DRAWINGS

FIG. 1 is a side elevation of a push-in Fastener 50 of the invention being used to secure a panel 10 to a workpiece 12;

FIG. 2 is a top view of fastener 50 of FIG. 1 taken along view line 2—2'; and

FIG. 3 is a view of tab 20 of leg 14' of fastener 50 of FIG. 1 taken along view line 3—3.

DESCRIPTION OF SOME PREFERRED EMBODIMENTS

Push-in fastener 50 of FIG. 1 is preferably a one piece construction folded into the configuration shown from a suitably resilient material such as a strip of suitable spring steel.

Fastener 50 has a base portion 4 that is preferably flat and has a threaded aperture 11 (shown in FIG. 2) for receiving a threaded member such as screw 8 therethrough. In FIG. 1, fastener 50 has been inserted through opening 16 in workpiece 12 and screw 8 has been used to threadingly secure panel 10 to fastener 50.

Aperture 11 is surrounded by a frusto conical projection 6 having a warped helical edge 7 shown in FIG. 2 that is adapted to threadingly engage threads 13 of threaded fastener 8. Although the use of such frusto conical projections having a helical thread engaging edge is preferred and well known to those skilled in the art, any form or type of threaded aperture through base portion 4 may be employed that is operative to receive a threaded member therethrough and become threadingly secured to it.

Fastener 50 has a pair of resilient legs 14 and 14' that extend from base portion 4 on opposite sides of aperture 11. Legs 14 and 14' converge angularly towards each other to a location having a predetermined distance "L" from base portion 4. It is to be noted that distance "L" is the approximate distance by which panel 10 is held apart from workpiece 12 when secured thereto by fastener 50.

Legs 14 an 14' then extend in substantial parallel relationship to each other in a direction substantially transverse to base portion 4 for a distance that is at least equivalent to finite thickness "T" of the wall of workpiece 12 surrounding opening 16.

As shown in FIG. 1, legs 14 and 14' then diverge angularly away from each other beneath opening 16, until a predetermined width "W$_2$" therebetween is reached at which, in the compressed or contracted state when legs 14 and 14' are inserted and pressed downwardly into opening 16, width "W$_2$" is sufficiently small to enable legs 14 and 14' to be received through opening 16 yet sufficiently large after having expanded away from each other upon emerging from the underside of opening 16 to effectively secure fastener 50 to workpiece 12.

Likewise, width "W$_1$" of legs 14 and 14' within opening 16 is small enough such that legs 14 and 14' can be received into opening 16 when legs 14 and 14' are contracted together yet is large enough such that, when legs 14 and 14' expand in the region of "W$_2$" after emerging from the bottom of opening 16, they engage the wall of workpiece 12 surrounding opening 16 to assist in securing fastener 50 to workpiece 12.

After having diverged away from each other to provide width "W$_2$", legs 14 and 14' then converge angularly towards each other in a direction away from base portion 4 and end in respective free-ends 18 and 18' with a section of leg 14' adjacent to free-end 18' folded about the surface of a section of leg 14 adjacent to free-end 18 that faces away from base portion 4 to provide a nested engagement therebetween.

Leg 14' includes a tab 20 in proximity to free-end 18 that extends angularly away from leg 14' towards leg 14 in a direction away from base portion 4. Tab 20 is positioned such that free-end 18 of leg 14 is able to be received into the pocket between leg 14' and tab 20 to lockingly engage legs 14 and 14' together.

As shown in FIGS. 1 and 3, the push-in fastener of the invention preferably further includes at least one lateral locking arm 21 that extends from at least one of legs 14 and 14' and bridges across the space therebetween and folds about the other leg to prevent shifting of one leg relative the other in a direction in and out of the page transversely to dimension "W₂" as viewed in FIG. 1. The push-in fastener of the invention even more preferably includes a pair of opposed arms 21 and 21' that bridge across from one leg to the other leg from opposite edges of one leg or from an opposite edge of each leg so as to box legs 14 and 14' therebetween sufficiently to prevent shifting of one leg relative the other as the lateral direction. In such instance, the arms need not extend about the leg whose lateral movement is being inhibited but need only engage an edge of the leg to effect the desired result.

Locking arm such as arm 21 alone or arms 21 and 21' are positioned along legs 14 and 14' in proximity to the location above where tab 20 is located such that its length between legs 14 and 14' is less than "W₂" so that it does not interfer with the process of pressing legs 14 and 14' into opening 16. Although arm 21 is preferably integral with one leg and folded about the other as shown in FIG. 1, it may also be in the form of a separate clip that folds about both legs to inhibit lateral movement.

Further, arm 21 need not be aligned parallel with base portion 4 and may be oriented angularly relative the leg from which it extends to facilitate folding as is well known to those skilled in the art.

FIG. 3 shows a face view of tab 20 and FIG. 2 also shows where base portion 4 may include projections such as projections 9 and 9' on opposite sides of base portion 4 that extend in a direction substantially transverse to the direction of legs 14 and 14'.

In operation then, tab 20 maintains a locked engagement between free-ends 18 and 18' of legs 14 and 14' to insure integrity and prevent warpage and movement of legs 14 and 14' in proximity to respective free-ends 18 and 18' as legs 14 and 14' of fastener 50 are pressed into opening 16 to secure fastener 50 to workpiece.

What is claimed is:

1. A push-in fastener having a base portion having a threaded aperture for receiving a threaded member therethrough from one side thereof and a pair of resilient legs extending from an opposite side thereof on opposite sides of the aperture to respective free-ends and configured to resiliently secure the fastener in a workpiece opening when pressed thereinto, said legs converging angularly towards each other in proximity to their respective free-ends and overlapping to provide a nested contacting engagement therebetween in a region adjacent their respective free-ends with one of said legs including a tab extending angularly towards the other leg in a direction away from the base portion to provide a pocket into which the free-end of the other leg is received to provide a locked engagement therebetween.

2. A push-in fastener for insertion into a workpiece opening in a compressed state to secure a threaded member thereto in an expanded state, said workpiece having a wall of finite thickness surrounding the opening, and said fastener having a base portion having a threaded aperture for receiving the threaded member therethrough from one side thereof and a pair of resilient legs respectively extending from an opposite side thereof on opposite sides of the threaded aperture and converging angularly towards each other to a location that is a prescribed distance from the base portion and thence in substantial parallel relationship to each other in a direction substantially transversely away from the base portion for a distance equivalent to at least the workpiece wall thickness surrounding the opening and spaced apart from each other such that the substantially parallel legs are able to engage the workpiece wall surrounding the opening when in the expanded state and thence diverging angularly away from each other for a distance sufficient to insure that the width therebetween is less than the opening width when the legs are in the compressed state and wider than the opening width when in the expanded state and thence converging angularly towards each other for a distance sufficient to enable a section adjacent a free-end of one leg to be folded about a surface of a section adjacent a free-end of the other leg facing away from the base portion to provide a nested contacting engagement therebetween with said one leg having a tab extending angularly away therefrom towards the other leg in a direction away from the base portion to provide a pocket into which the free-end of the one leg is received to establish locked engagement therebetween.

3. The fastener of claim 1 or 2 in the form of a one piece construction made from a resilient strip material.

4. The fastener of claim 1 or 2 further including at least one locking arm extending from at least one of the legs across the space therebetween and about the other leg at a location therealong at which the arm is operative to inhibit lateral movement of one leg relative the other without interferring with the process of pressing the legs into the opening.

5. The fastener of claim 4 having two locking arms extending across the space between the legs in a manner effective to inhibit lateral movement of one leg relative the other.

* * * * *